E. D. MACKINTOSH.
CENTRIFUGAL MACHINE.
APPLICATION FILED OCT. 30, 1918.
1,321,767.
Patented Nov. 11, 1919.
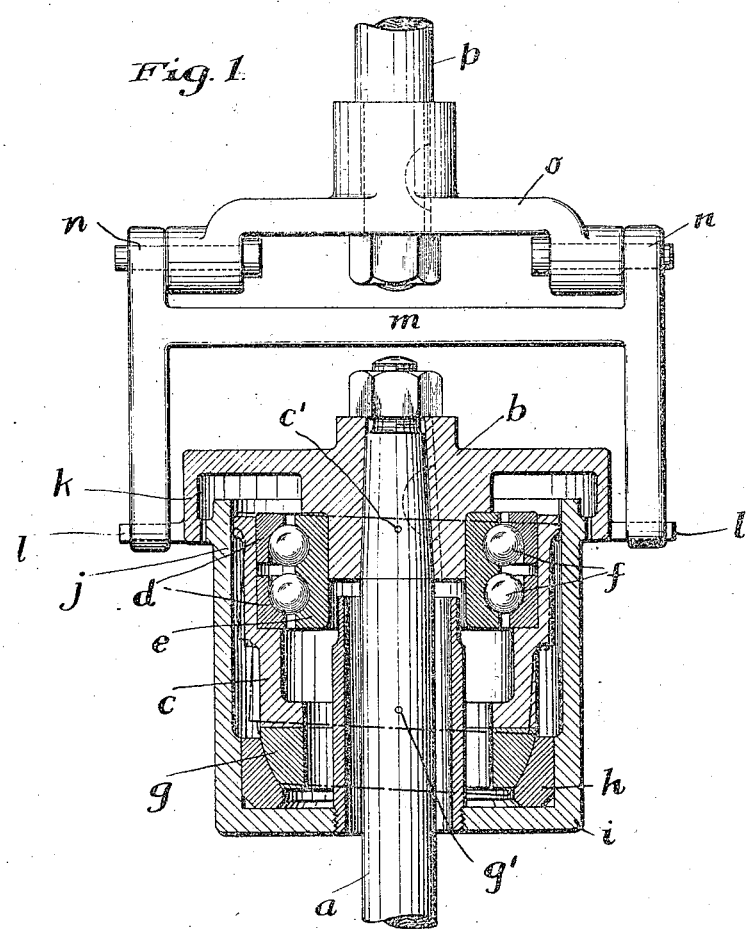
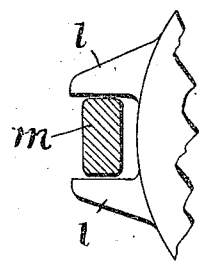
Edward D. Mackintosh
INVENTOR

UNITED STATES PATENT OFFICE.

EDWARD D. MACKINTOSH, OF BROOKLYN, NEW YORK, ASSIGNOR TO S. S. HEPWORTH COMPANY, OF NEW YORK, N. Y., A CORPORATION OF NEW YORK, AND EDITH M. MACKINTOSH, OF BROOKLYN, NEW YORK.

CENTRIFUGAL MACHINE.

1,321,767.

Specification of Letters Patent. Patented Nov. 11, 1919.

Application filed October 30, 1918. Serial No. 260,267.

*To all whom it may concern:*

Be it known that I, EDWARD D. MACKINTOSH, a citizen of the United States, residing at Brooklyn, in the county of Kings and the State of New York, have invented a new and useful Improvement in Centrifugal Machines, of which the following is a specification.

My invention relates to hanging centrifugal machines driven by direct connected motors.

The object of my invention is to apply motive power, other than by a belt, to a hanging and swingable centrifugal machine.

Referring to the accompanying drawing, forming part of this specification:

Figure 1 is an elevation, partly in section, of my improvement.

Fig. 2 is a top plan of one of the details.

$a$ is the spindle of the centrifugal machine fixed to a hub $b$. This hub is rotatively supported by a bearing consisting of a non-rotating cup $c$ with non-rotating ball races $d$, a rotating ball race $e$, and balls $f$ between the races, the hub $b$ resting on the rotating ball race and the cup $c$ supporting all.

The cup rests upon a table $g$ which is tiltable, in any direction, in a socket $h$ held by a support $i$.

The support $i$ is formed with a ring part $j$ which closely confines the upper part of the bearing laterally but clears it enough to allow it to swing to the position shown by the broken lines, the table $g$ tilting to accommodate itself to the position taken by the bearing. The tilting of the table takes place about the center $g'$ and the bearing swings about the center $c'$ at the upper part thereof.

A flange $k$ is formed integrally with the hub $b$ and has lugs $l$, at diametrically opposite sides of the flange, and forming part of it, which loosely engage an H-shaped link $m$, there being lugs both in front of and behind the link, to form forks, closely embracing it. This link is pivoted, at $n\ n$, to the head $o$, to swing about a horizontal axis, and the head is fixed to the spindle $p$ of a non-swingable motor.

The part of the flange which carries the lugs is in the form of a ring depending from the horizontal part of the said flange and closely surrounding, but not touching, the support $i$. One object in forming the flange with this depending ring is to keep dirt and dust from getting to the bearing.

In operation, the centrifugal machine swings, when it swings at all, about the center $c'$ while the swingable H-shaped link acts as an equalizer to transmit equal power to the lugs $l$ at the two sides of the flange $k$. This link, having once swung into contact with the lugs at the two sides of the flange, does not thereafter swing when the centrifugal machine swings. This is because it engages the lugs at the level of the point about which the centrifugal machine swings, viz: center $c'$.

I claim:

1. A swingable bearing, a vertical shaft supported thereby, a tiltable table underneath the bearing and supporting it, and a stationary ring confining the upper part of the bearing and restraining the said upper part from moving laterally to any considerable extent but not restraining it from swinging.

2. A swingable bearing, a vertical shaft supported thereby, a tiltable table underneath the bearing and supporting it, a stationary ring confining the upper part of the bearing and restraining the said upper part from moving laterally to any considerable extent but not restraining it from swinging, and a flange supported by the bearing and closely surrounding the stationary ring without touching it.

3. A non-swingable vertical shaft, a swingable shaft in line therewith, a head fixed to the non-swingable shaft, a flange fixed to the swingable shaft, and a link pivoted to the head to swing about a horizontal axis and loosely engage diametrically opposite sides of the flange at substantially the level of the point about which the swingable shaft swings.

4. A swingable bearing, a tiltable table underneath the bearing and supporting it, a stationary ring confining the upper part of the bearing and restraining the said upper part from moving laterally to any considerable extent but not restraining it from swinging, a non-swingable vertical shaft, a swingable shaft in line therewith and supported by the swingable bearing, a head fixed to the non-swingable shaft, a flange fixed to the swingable shaft, and a link pivoted to the head to swing about a horizontal axis and loosely engage the diametrically opposite sides of the flange at substantially the level of the point about which the swingable shaft swings.

5. A swingable bearing, a tiltable table underneath the bearing and supporting it, a stationary ring confining the upper part of the bearing and restraining the said upper part from moving laterally to any considerable extent but not restraining it from swinging, a flange supported by the bearing and closely surrounding the stationary ring without touching it, a non-swingable vertical shaft, a swingable shaft in line therewith and supported by the swingable bearing, a head fixed to the non-swingable shaft, a flange fixed to the swingable shaft, and a link pivoted to the head to swing about a horizontal axis and loosely engage the diametrically opposite sides of the flange at substantially the level of the point about which the swingable shaft swings.

EDWARD D. MACKINTOSH.